(12) United States Patent
Baeuerle

(10) Patent No.: US 7,251,989 B2
(45) Date of Patent: Aug. 7, 2007

(54) METHOD AND DEVICE FOR OPERATING AN INTERNAL COMBUSTION ENGINE

(75) Inventor: Michael Baeuerle, Ditzingen-Heimerdingen (DE)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 10/781,578

(22) Filed: Feb. 17, 2004

(65) Prior Publication Data

US 2004/0216519 A1 Nov. 4, 2004

(30) Foreign Application Priority Data

Feb. 20, 2003 (DE) .............................. 103 07 132

(51) Int. Cl.
*G01M 15/00* (2006.01)
(52) U.S. Cl. ........................... 73/116; 73/118.1
(58) Field of Classification Search ........... 73/116–120
See application file for complete search history.

(56) References Cited

U.S. PATENT DOCUMENTS

| | | | | |
|---|---|---|---|---|
| 5,022,224 A | * | 6/1991 | Smith ........................... | 60/792 |
| 5,042,245 A | * | 8/1991 | Zickwolf, Jr. ................. | 60/773 |
| 5,072,580 A | * | 12/1991 | Patterson et al. ............. | 60/242 |
| 5,279,107 A | * | 1/1994 | Meisner et al. ............... | 60/773 |
| 5,546,795 A | | 8/1996 | Yamagishi | |
| 6,298,718 B1 | * | 10/2001 | Wang ........................ | 73/118.1 |
| 6,425,247 B1 | | 7/2002 | Schmid | |
| 6,644,029 B2 | * | 11/2003 | Weinreuter ................... | 60/602 |
| 6,928,360 B2 | * | 8/2005 | Baeuerle et al. ............. | 701/102 |

FOREIGN PATENT DOCUMENTS

| | | |
|---|---|---|
| DE | 197 40 968 | 3/1999 |
| DE | 101 24 543 | 11/2002 |
| DE | 102 35 891 | 8/2003 |
| EP | 1085188 | 3/2001 |
| JP | 2001-123844 | 5/2001 |
| WO | WO2003/071111 | 8/2003 |

* cited by examiner

*Primary Examiner*—Edward Lefkowitz
*Assistant Examiner*—Jermaine Jenkins
(74) *Attorney, Agent, or Firm*—Kenyon & Kenyon LLP

(57) ABSTRACT

A method and a device are provided for diagnosing operation of an internal combustion engine having a compressor for compressing air supplied to the internal combustion engine, which method and device permit diagnosis of as many error patterns in the compressor operation as possible without the use of additional sensors. An actual pressure ratio across the compressor is measured for a compression diagnosis. The measured actual pressure ratio is compared with a predetermined reference value, and an error is detected as a function of the result of the comparison.

19 Claims, 3 Drawing Sheets

METHOD AND DEVICE FOR OPERATING AN INTERNAL COMBUSTION ENGINE

FIELD OF THE INVENTION

The present invention is directed to a method and a device for operating an internal combustion engine, and relates more particularly to compression diagnosis of a compressor in the internal combustion engine.

BACKGROUND OF THE INVENTION

Internal combustion engines having a compressor for compressing the air supplied to the internal combustion engine are known in the art, e.g., published Japanese patent document JP-2001-123844 describes a method for diagnosing an electric booster compressor, whereby a plausibility check is performed on the rotational speed signals of the electric booster compressor. An error is deduced if the actual rotational speed of the electric booster compressor deviates from the setpoint rotational speed for more than a certain period of time despite the rotational speed regulation.

Published German patent document DE 101 24 543 describes a method for controlling an electrically operated supercharger that cooperates with an exhaust gas turbocharger, in particular how a setpoint pressure ratio, referred to here as vpsoll, and an actual pressure ratio, referred to here as vpist, across electrically operated supercharger 5 are determined. Actual pressure ratio vpist may be modeled on the basis of the engine speed and the mass air flow rate measured by mass air flow meter 40 with the aid of an engine characteristics map, and as a function of the ambient pressure measured by ambient pressure sensor 30 and the boost pressure measured by boost pressure sensor 25. This modeling presupposes that the mass air flow rate measured by mass air flow meter 40 flows completely through first compressor 15. In the case when bypass valve 70 is stuck open, this prerequisite is not met and the air flow through bypass 70 is unknown. In this case, the modeling of the actual pressure ratio is faulty. The modeled actual pressure ratio is also referred to below as vpmod. If, according to published German patent document DE 101 24 543, a setpoint value for the mass air flow rate (determined as a function of a driver's intent and additional operating variables, for example) is used instead of the mass air flow rate measured by mass air flow meter 40, this yields setpoint ratio vpsoll across first compressor 5 instead of modeled actual pressure ratio vpmod. The driver's intent may be determined by a gas pedal (not shown in FIG. 1), the degree of actuation of which is forwarded to engine controller 20 for analysis.

German patent document DE 102 35 891, published on Aug. 14, 2003, describes a defined triggering of electrically operated supercharger as part of an early run-up of the electrically operated supercharger.

Published German patent document DE 197 40 968 discloses that setpoint value $m_{Lsetpoint}$ for the mass air flow rate may be determined in the air supply regardless of the driver's intent or the driver's desired torque.

SUMMARY

The method and device according to the present invention for operating an internal combustion engine provide the advantage over the related art in that the compression diagnosis may be performed with less complexity, using existing sensors. In accordance with the present invention, an actual pressure ratio across the compressor is measured for a compression diagnosis. The measured actual pressure ratio is compared with a predetermined reference value, and an error is detected as a function of the result of the comparison. In this way, the compression diagnosis may be performed with less complexity and by using sensors already installed. No additional sensor is necessary for determining the actual rotational speed of the compressor. In addition, error patterns which do not depend on the setpoint rotational speed or actual rotational speed of the compressor may also be diagnosed by the method and device according to the present invention.

In accordance with the present invention, a setpoint pressure ratio may be selected as the predetermined reference value. This makes it possible to implement the diagnosis of the compressor with minimal use of sensors, as well as allowing detection of the following error patterns, inter alia, without drawing any conclusions as to the source of the error: hose failure downstream from the compressor; error patterns in which the setpoint rotational speed is not equal to the actual rotational speed of the compressor; and a situation in which a bypass valve is stuck in open position.

In accordance with the present invention, another advantage is obtained when a modeled actual pressure ratio is selected as the predetermined reference value. This permits a restriction of the possible error sources to the following error sources: a situation in which a bypass valve is stuck in open position; and hose failure downstream from the compressor.

In accordance with the present invention, an electrically operated supercharger may be selected as the compressor, and the diagnosis may be performed in an idling or near-idling state. This makes it possible to disregard the pressure component of an exhaust gas turbocharger connected in series with the electrically operated supercharger in the air supply to the internal combustion engine, so that a boost pressure sensor downstream from the exhaust gas turbocharger detects in very good approximation only the pressure component of the electrically operated supercharger in this operating state of the internal combustion engine. This eliminates the need for a separate boost pressure sensor between the electrically operated supercharger and the exhaust gas turbocharger.

In accordance with the present invention, another advantage is obtained when the electrically operated supercharger is triggered in a defined manner for the diagnosis, for example, as part of an early run-up. In this way the electrically operated supercharger is operable independently of an exhaust gas turbocharger which is optionally present in the air supply to the internal combustion engine, and this ensures that the exhaust gas turbocharger will not influence the result of the diagnosis.

In accordance with the present invention, another advantage is obtained when a diverting air valve is closed for the diagnosis. This makes it possible to achieve a defined mass air flow rate through the air supply, and thus achieve a reliable diagnostic result.

DETAILED DESCRIPTION

Figure 1:
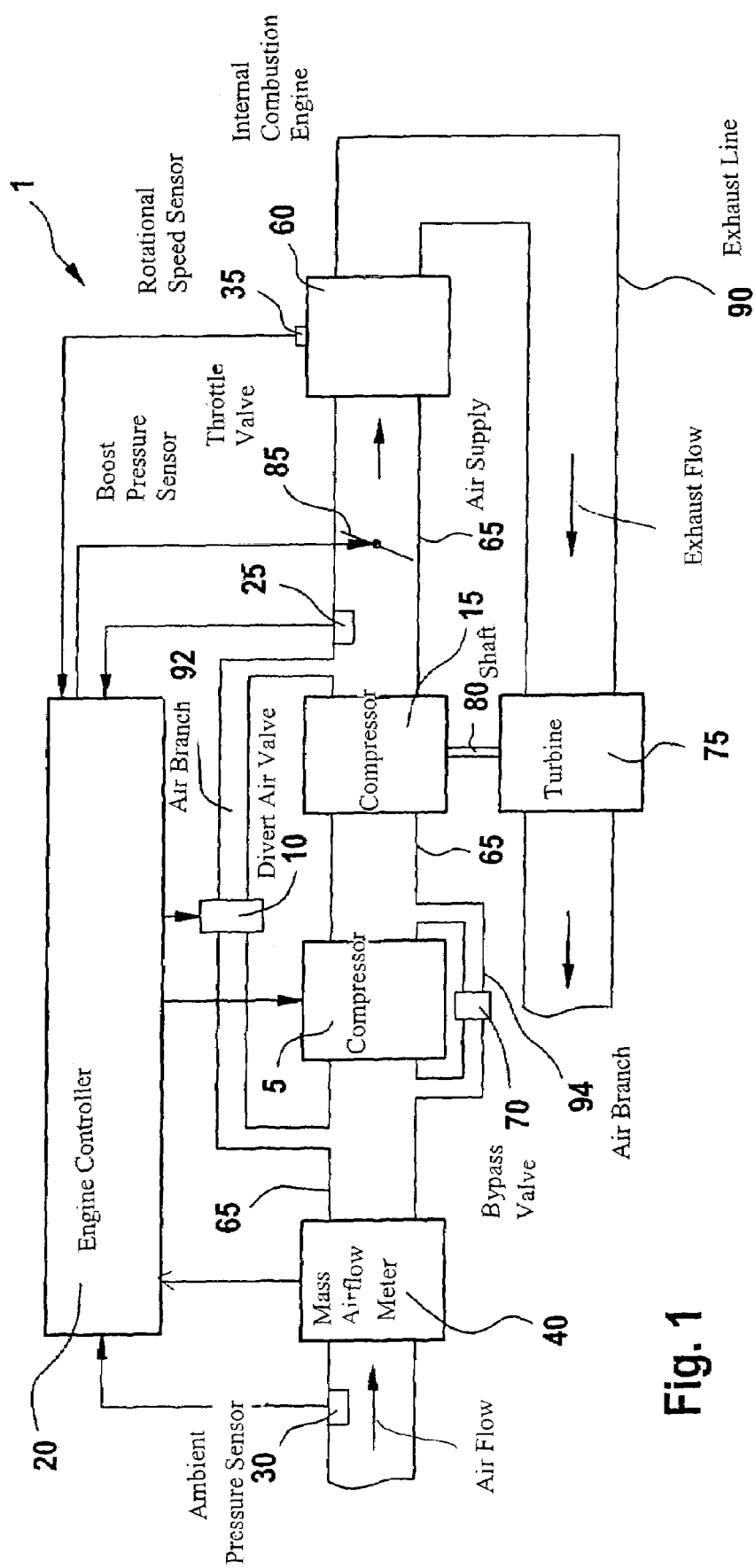
FIG. 1 shows a schematic view of an internal combustion engine for the purpose of illustrating the method and the device according to the present invention.

FIG. 1 shows an overall internal combustion engine system 1, e.g., of a motor vehicle. The overall internal combustion engine system 1 includes an internal combustion engine 60, which may be designed as an Otto engine or a diesel engine, for example. As an example, it is assumed below that combustion engine 60 is an Otto engine. Fresh air for combustion is supplied to combustion engine 60 through an air supply 65. Fuel is supplied through a fuel injector (not shown in FIG. 1) either directly into a combustion chamber of combustion engine 60 or indirectly through air supply 65 between a throttle valve 85 and an intake valve (not shown in FIG. 1) of combustion engine 60. The air/fuel mixture in the combustion chamber of combustion engine 60 is ignited by a spark plug (not shown in FIG. 1). Combustion engine 60 may be designed as a single-cylinder or multicylinder engine. Exhaust gas formed by combustion is ejected from combustion engine 60 through an exhaust valve (not shown in FIG. 1) into an exhaust line 90. In this example, a turbine 75 of an exhaust gas turbocharger is situated in exhaust line 90, driving a compressor 15 of the exhaust gas turbocharger in air supply 65 via a shaft 80. Compressor 15 of the exhaust gas turbocharger as a second compressor is situated in air supply 65 downstream from a first compressor 5 in air supply 65 in the direction of flow, where the direction of flow of the fresh air in air supply 65 is indicated by an arrow. First compressor 5 in this example is designed as an electrically operated supercharger. The direction of flow of the exhaust gas in exhaust line 90 is also indicated by an arrow.

A first air branch 92 is connected in parallel with first compressor 5 and second compressor 15 in air supply 65 and includes a divert air valve 10, with the help of which unwanted compressor pumping is preventable in a manner with which those skilled in the art are familiar. Therefore, divert air valve 10 is triggered by an engine controller 20. A second air branch 94 is connected in parallel with first compressor 5 in air supply 65 and is also known as a bypass. Second air branch 94 also includes a bypass valve 70. First compressor 5, which is designed here as an electrically operated supercharger as an example, is driven by an electric motor which is triggered by engine controller 20 to adjust a setpoint rotational speed. Upstream from electrically operated supercharger 5, there is a mass air flow meter 40, e.g., a hot-film mass air flow meter, which measures the mass air flow rate of fresh air supplied to internal combustion engine 1 through air supply 65 and sends the measurement result to engine controller 20. Adjacent to and upstream from mass air flow meter 40, an ambient pressure sensor 30 is provided in air supply 65, measuring the air pressure in air supply 65 before compression and also relaying this information to engine controller 20. This air pressure corresponds approximately to ambient pressure. Ambient pressure sensor 30 could also be situated between mass air flow meter 40 and electrically operated supercharger 5 in air supply 65, where ambient pressure also prevails. A boost pressure sensor 25 is provided between second compressor 15 and throttle valve 85 in air supply 65 to measure the boost pressure in air supply 65 and also to relay this pressure value to engine controller 20. Engine controller 20 also controls the position of throttle valve 85 for adjusting a desired air supply to combustion engine 60. In addition, engine controller 20 triggers the fuel injection and the ignition point in time (in a manner not depicted in FIG. 1). In addition, a rotational speed sensor 35 is provided on combustion engine 60 to measure the engine speed and to likewise relay the measurement result to engine controller 20. With the help of exhaust gas turbocharger that includes elements 15, 75, and 80, the engine controller 20 is able to implement a predetermined compressor pressure ratio via second compressor 15 in air supply 65. To do so, engine controller 20 may trigger a degree of opening of a waste gate which bypasses turbine 75 in exhaust line 90, and/or the engine controller may trigger the adjustment of a corresponding turbine geometry. When starting up the motor vehicle, exhaust gas turbocharger (15, 75, 80) does not respond immediately, which phenomenon is referred to as a turbo hole. Electrically operated supercharger 5 is provided for remedying this phenomenon, and is activated during startup of the vehicle as part of an early run-up to support the exhaust gas turbocharger during the startup operation, which makes it possible to compensate for the turbo hole. After the turbo hole has been overcome and second compressor 15 is able to build up the required compressor pressure ratio alone, electrically operated supercharger 5 is shut down by engine controller 20 and/or neutralized by opening bypass valve 70. Bypass valve 70 may also be triggered by engine controller 20 or designed as a non-return valve.

Figure 2:
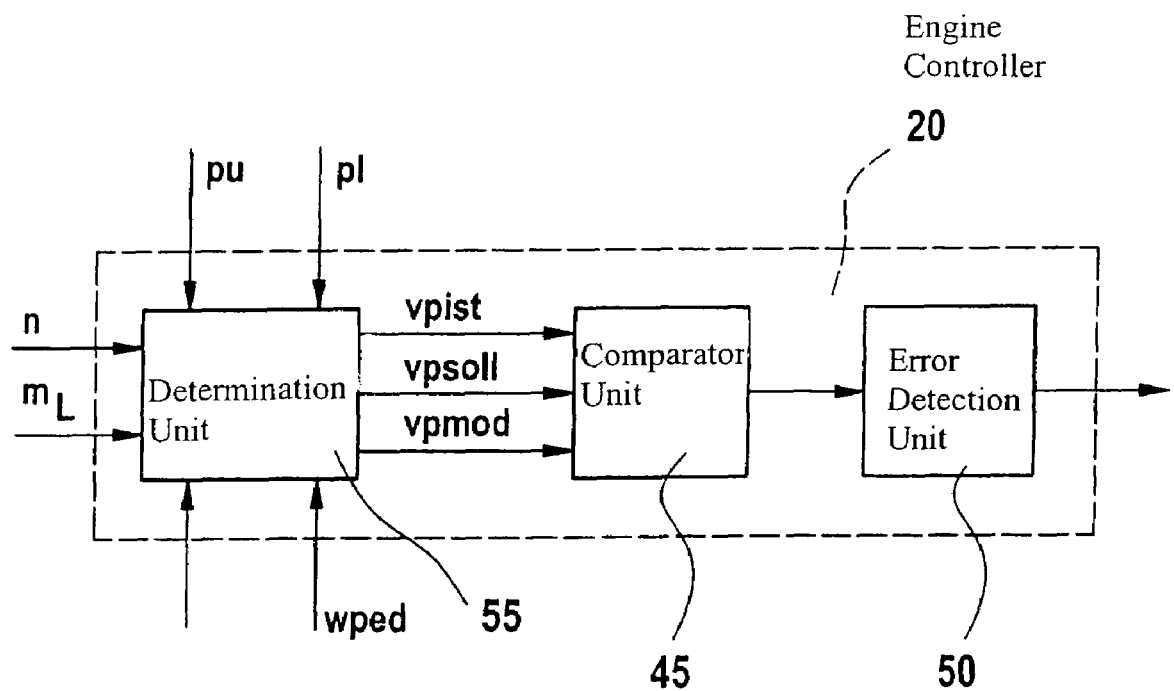
FIG. 2 shows a block diagram of an engine controller for the purpose of illustrating the method and the device according to the present invention.

FIG. 2 shows a block diagram of engine controller 20, where engine controller 20 includes determination means or unit 55 which receives engine speed n from rotational speed sensor 35 and mass air flow rate $m_L$ from mass air flow meter 40. Furthermore, ambient pressure pu is sent from ambient pressure sensor 30 to determination means or unit 55, and boost pressure pl is also sent from boost pressure sensor 25 to the determination unit. In addition, the degree of actuation wped of the gas pedal is also sent to determination unit 55 from the gas pedal. Depending on the degree of actuation wped, determination means 55 determine a setpoint value $m_{Lsetpoint}$ for the mass air flow rate in air supply 65, taking into account additional operating variables of internal combustion engine 1, if necessary. In addition, determination means or unit 55 determines modeled actual pressure ratio vpmod and setpoint pressure ratio vpsoll across first compressor 5 in the manner described here. Furthermore, determination unit 55 determines a measured value vpist for the pressure ratio across first compressor 5 and second compressor 15 from quotient pl/pu. Measured value vpist, setpoint pressure ratio vpsoll, and modeled actual pressure ratio vpmod are sent to comparator means or unit 45 of engine controller 20 which compare measured value vpist with setpoint pressure ratio vpsoll and/or modeled actual pressure ratio vpmod. The result(s) of this comparison is/are then sent to error detection means or unit 50 of engine controller 20, which then performs an error diagnosis, depending on the result(s), and, if necessary, delivers an error message to a display device in an instrument cluster of the motor vehicle, for example.

If we consider the idling or near-idling state of internal combustion engine 1, the pressure component of exhaust gas turbocharger (15, 75, 80) in the compressor pressure ratio across first compressor 5 and second compressor 15 may be disregarded, because this pressure component of the exhaust gas turbocharger does not play a significant role in the mass air flow range which characterizes the idling or near-idling state due to the thermodynamic design of the exhaust gas turbocharger. Boost pressure sensor 25 therefore detects only the pressure component of electrically driven supercharger 5 in the compressor pressure ratio across first compressor 5 and second compressor 15 in very good approximation in the idling or near-idling state of internal combustion engine 1.

To generate the pressure component of electrically operated supercharger 5, a defined triggering of electrically operated supercharger 5 in the idling or near-idling state of internal combustion engine 1 is advantageous. This situation exists, for example, as part of an early run-up of electrically operated supercharger 5. In this case, a triggering signal is formed by engine controller 20, triggering electrically operated supercharger 5 so that electrically operated supercharger 5 increases its rotational speed as a function of an operating state of internal combustion engine 1 even during this operating state, this immediately preceding an increase in the driver's desired torque. This operating state may be achieved, for example, by actuation of a clutch, by release of a brake pedal when a driving gear is engaged or by recognition of an acceleration or startup process of at least one vehicle driving in front of one's own vehicle. However, regardless of such an early run-up in the idling or near-idling state of internal combustion engine 1, a defined triggering of electrically operated supercharger 5 may also be set in a controlled manner by engine controller 20. For error diagnosis, engine controller 20 should trigger divert air valve 10 in such a way as to achieve a defined mass air flow rate, which passes completely through electrically operated supercharger 5 and is measurable by mass air flow meter 40.

Measured value vpist of the pressure ratio is also referred to below as the measured actual pressure ratio. A comparison of measured actual pressure ratio vpist with setpoint pressure ratio vpsoll in comparator means or unit 45 makes it possible to recognize the following error patterns without regard for the source of the error:
 hose failure in air supply 65 downstream from electrically operated supercharger 5,
 all error patterns in which the setpoint rotational speed deviates from the actual rotational speed of electrically operated supercharger 5 for more than a certain period of time despite the rotational speed being regulated,
 bypass valve 70 opened by mistake.

A comparison of measured actual pressure ratio vpist with modeled actual pressure ratio vpmod in comparator means or unit 45 permits a restriction of the possible error sources to the following error sources:
 bypass valve 70 opened by mistake; and
 hose failure in air supply 65 upstream from electrically operated supercharger 5 and downstream from mass air flow meter 40.

Figure 3:
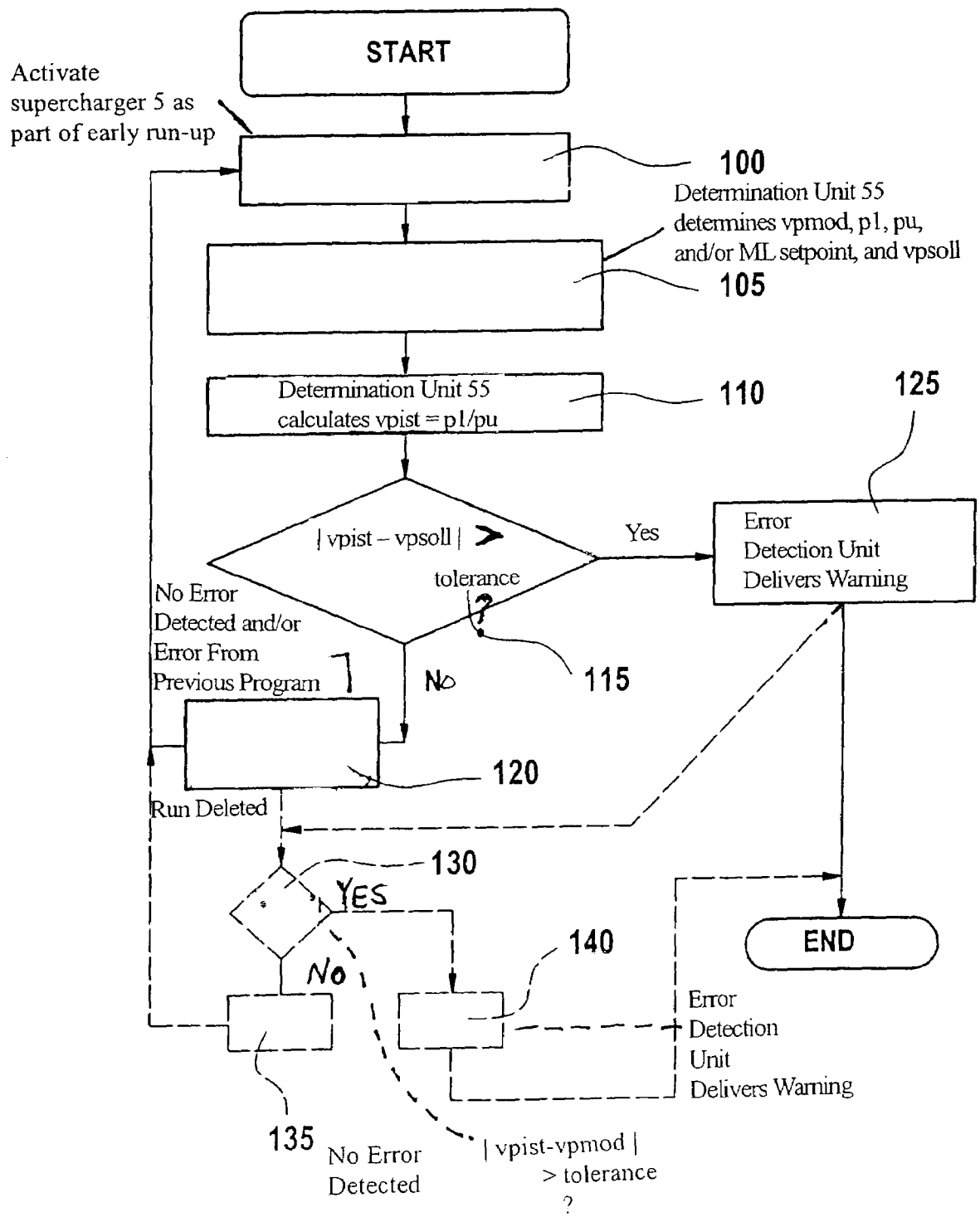
FIG. 3 shows a flow chart illustrating an exemplary sequence of the method according to the present invention.

FIG. 3 shows a flow chart for an exemplary sequence of operation steps in the method according to the present invention. After the start of the program, engine controller 20 activates electrically operated supercharger 5 at a program point 100 when internal combustion engine 1 is idling or in an operating state approaching idling, e.g., as part of an early run-up as described above. Then the program branches off to a program point 105.

At program point 105, determination unit 55 of engine controller 20 inputs instantaneous boost pressure pl from boost pressure sensor 25 and instantaneous ambient pressure pu from ambient pressure sensor 30. In addition, at program point 105 determination unit 55 also inputs instantaneous engine speed n from rotational speed sensor 35 and instantaneous mass air flow rate $m_L$ from air flow meter 40. Determination unit 55 determines from these values modeled actual pressure ratio vpmod by the method described here with the help of the engine characteristics map, and boost pressure pl as well as ambient pressure pu. Additionally or alternatively, at program point 105, determination unit 55 enters the degree of actuation wped from the gas pedal plus, if necessary, other operating variables of internal combustion engine 1 and also determines from this data setpoint value $m_{Lsetpoint}$ for the mass air flow rate in air supply 65 by the method described above. As previously noted, published German patent document DE 197 40 968 discloses that setpoint value $m_{Lsetpoint}$ for the mass air flow rate may be determined in the air supply regardless of the driver's intent or the driver's desired torque. Accordingly, determination of setpoint value $m_{Lsetpoint}$ for mass air flow rate in air supply 65 may therefore be performed, for example, according to the method disclosed in German patent document DE 197 40 968. By the method described here, determination unit 55 determines setpoint pressure ratio vpsoll from this setpoint value $m_{Lsetpoint}$ for the mass air flow rate and instantaneous engine speed n with the help of the engine characteristics map as well as boost pressure pl and ambient pressure pu; subsequently, the method branches back to a program point 110.

At program point 110, determination unit 55 calculates measured actual pressure ratio vpist=pl/pu from boost pressure pl and ambient pressure pu. Then the program branches off to a program point 115.

At program point 115, comparator means or unit 45 compares measured actual pressure ratio vpist with setpoint pressure ratio vpsoll. If the measured actual pressure ratio deviates from the setpoint pressure ratio for more than a predetermined debounce time and by more than a predetermined tolerance value, then the program branches off to a program point 125; otherwise it branches off to a program point 120.

At program point 125, error detection means or unit 50 has recognized an error on the basis of the deviation between measured actual pressure ratio vpist and setpoint pressure ratio vpsoll by more than the predetermined tolerance value, this deviation having been output by comparator means 45 for more than the predetermined debounce time, this error being due to a hose failure downstream from electrically operated supercharger 5, due to all error patterns in which the setpoint rotational speed of electrically operated supercharger 5 deviates from the actual rotational speed of electrically operated supercharger 5 for more than a certain period of time, despite the rotational speed being regulated or due to a bypass valve 70 being opened incorrectly. Error detection means or unit 50 then delivers a warning to the driver, e.g., by activation of a warning lamp on the instrument cluster of the motor vehicle. Then the program is stopped.

At program point 120, no error is detected and/or an error detected in a previous program run is deleted again by error detection means 50. Then the program branches back to program point 100.

With the warning to the driver at program point 125, the driver is notified that an error due to a hose failure in air supply 65 downstream from electrically operated supercharger 5, an error in electrically operated supercharger 5 due to a deviation between the setpoint rotational speed and the actual rotational speed of electrically operated supercharger 5 lasting more than a certain period of time, or an error due to a bypass valve 70 being opened incorrectly has occurred. In addition, it is now possible to provide for the program to branch off to a program point 130 after program point 120 and after program point 125, as indicated with broken lines in FIG. 3. At program point 130, comparator means or unit 45 compares measured actual pressure ratio vpist with modeled actual pressure ratio vpmod and deliver the result of the comparison to error detection means or unit 50. If measured actual pressure ratio vpist deviates from modeled actual pressure ratio vpmod by more than the predetermined tolerance value for longer than the predetermined debounce time, then the program branches off to a program point 140; otherwise it branches off to a program point 135.

At program point 140, error detection means or unit 50 detects an error due to a bypass valve 70 which has been opened incorrectly or a hose failure upstream from electrically operated supercharger 5 and downstream from mass air flow meter 40, this error being displayed accordingly by a driver warning, e.g., by another warning lamp on the instrument cluster of the motor vehicle. Then the program is stopped.

At program point 135, error detection means or unit 45 has not detected any error. Then the program branches back to program point 100. Instead of the additional comparison according to inquiry 130, shown with broken lines in FIG. 3, the comparison may be made between measured actual pressure ratio vpist and modeled actual pressure ratio vpmod instead of program point 115 and the comparison there between measured actual pressure ratio vpist and setpoint pressure ratio vpsoll, in which case program point 125 is then replaced by program point 140 and program point 120 is replaced by program point 135.

The method described here makes it possible to implement a diagnosis of the compression produced by electrically operated supercharger 5, in which it is possible to detect the errors described here of the hose failure upstream or downstream from electrically operated supercharger 5, the bypass valve being opened incorrectly or the electrically operated supercharger itself due to a deviation between the setpoint rotational speed and the actual rotational speed lasting for more than a predetermined period of time.

The method and device according to the present invention for diagnosing compression may be used for any compressors for compression of the air to be supplied to internal combustion engine 1 in a corresponding manner. For example, diagnosis of compression implemented essentially by exhaust gas turbocharger (15, 75, 80) may be implemented in air supply 65, in which electrically operated supercharger 5 is either not present at all or is deactivated, and exhaust gas turbocharger 15 is triggered in a defined manner via the waste gate, for example. This may be accomplished in a full-load operating state, for example. As an alternative, a mechanical compressor designed as a supercharger and the compression achieved by it in air supply 65 may also be diagnosed. A defined triggering of the supercharger may be implemented for example by adjusting a defined degree of opening of a bypass valve of a bypass which bypasses the supercharger in air supply 65. In the case of the supercharger, the diagnosis may also be performed in a full-load operation of internal combustion engine 1 when electrically operated supercharger 5 is either out of operation or is not present at all.

What is claimed is:

1. A method for operating an internal combustion engine, the internal combustion engine having a compressor to compress air supplied to the internal combustion engine, the method comprising:
   measuring an actual pressure ratio across the compressor for diagnosing a compression;
   comparing the measured actual pressure ratio to a modeled actual pressure ratio; and
   detecting an error as a function of a result of the comparing of the ratios, wherein the error is used to operate the internal combustion engine.

2. The method as recited in claim 1, wherein the modeled actual pressure ratio is the setpoint pressure ratio across the compressor.

3. The method as recited in claim 2, wherein the compressor is an electrically operated supercharger.

4. The method as recited in claim 3, wherein the diagnosis is performed in one of an idling state and a near-idling state.

5. The method as recited in claim 2, wherein the compressor is one of an exhaust gas turbocharger and a supercharger.

6. The method as recited in claim 1, wherein the modeled actual pressure ratio is determined based on at least one engine parameter.

7. The method as recited in claim 6, wherein the modeled actual pressure ratio is determined as a function of an engine speed and an air mass flow rate.

8. The method as recited in claim 6, wherein the compressor is an electrically operated supercharger.

9. The method as recited in claim 8, wherein the diagnosis is performed in one of an idling state and a near-idling state.

10. The method as recited in claim 6, wherein the compressor is one of an exhaust gas turbocharger and a supercharger.

11. A method for diagnosing operation of an internal combustion engine having a compressor for compression of air supplied to the internal combustion engine, comprising:
    measuring an actual pressure ratio across the compressor;
    comparing the measured actual pressure ratio with a predetermined reference value; and
    detecting an error as a function of the result of the comparison;
    wherein the predetermined reference value is a setpoint pressure ratio across the compressor,
    wherein the compressor is an electrically operated supercharger, and
    wherein the electrically operated supercharger is triggered in a defined manner, as part of an early run-up.

12. A method for diagnosing operation of an internal combustion engine having a compressor for compression of air supplied to the internal combustion engine, comprising:
    measuring an actual pressure ratio across the compressor;
    comparing the measured actual pressure ratio with a predetermined reference value; and
    detecting an error as a function of the result of the comparison;
    wherein the predetermined reference value is a setpoint pressure ratio across the compressor,
    wherein the compressor is an electrically operated supercharger,
    wherein the diagnosis is performed in one of an idling state and a near-idling state, and
    wherein the electrically operated supercharger is triggered in a defined manner, as part of an early run-up.

13. The method as recited in claim 12, wherein a divert air valve is closed for the diagnosis.

14. A method for diagnosing operation of an internal combustion engine having a compressor for compression of air supplied to the internal combustion engine, comprising:
    measuring an actual pressure ratio across the compressor;
    comparing the measured actual pressure ratio with a predetermined reference value; and
    detecting an error as a function of the result of the comparison;
    wherein the predetermined reference value is a modeled actual pressure ratio determined based on at least one engine parameter, wherein the compressor is an electrically operated supercharger, and wherein the electrically operated supercharger is triggered in a defined manner, as part of an early run-up.

15. A method for diagnosing operation of an internal combustion engine having a compressor for compression of air supplied to the internal combustion engine, comprising:

measuring an actual pressure ratio across the compressor;

comparing the measured actual pressure ratio with a predetermined reference value; and detecting an error as a function of the result of the comparison;

wherein the predetermined reference value is a modeled actual pressure ratio determined based on at least one engine parameter, wherein the compressor is an electrically operated supercharger, wherein the diagnosis is performed in one of an idling state and a near-idling state, and wherein the electrically operated supercharger is triggered in a defined manner, as part of an early run-up.

16. The method as recited in claim 15, wherein a divert air valve is closed for the diagnosis.

17. A device for operating an internal combustion engine, the internal combustion engine having a compressor to compress air supplied to the internal combustion engine, the device comprising:

a determining arrangement, for diagnosing a compression, to determine an actual pressure ratio across the compressor from variables measured by a measuring arrangement;

a comparing arrangement to compare the actual pressure ratio with a modeled actual pressure ratio; and an error detecting arrangement to detect an error as a function of a result of the comparing.

18. A device for operating an internal combustion engine, the internal combustion engine having a compressor to compress air supplied to the internal combustion engine, the device comprising:

a determining arrangement, for diagnosing a compression, to determine an actual pressure ratio across the compressor from variables measured by a measuring arrangement;

a comparing arrangement to compare the actual pressure ratio with a setpoint pressure ration that is to be set; and an error detecting arrangement to detect an error as a function of a result of the comparing.

19. A method for operating an internal combustion engine, the internal combustion engine having a compressor to compress air supplied to the internal combustion engine, the method comprising:

measuring an actual pressure ratio across the compressor for diagnosing a compression;

comparing the measured actual pressure ratio with a setpoint pressure ratio that is to be set; and detecting an error as a function of a result of the comparing.

* * * * *